United States Patent
Inagaki et al.

(10) Patent No.: US 7,049,770 B2
(45) Date of Patent: May 23, 2006

(54) CURRENT CONTROL CIRCUIT AND MOTOR DRIVE CIRCUIT THAT CAN ACCURATELY AND EASILY CONTROL A DRIVE CURRENT

(75) Inventors: Yasuhiko Inagaki, Atsugi (JP); Tomomitsu Oohara, Atsugi (JP)

(73) Assignee: Mitsumi Electric Co., Ltd. (JP)

( * ) Notice: Subject to any disclaimer, the term of this patent is extended or adjusted under 35 U.S.C. 154(b) by 134 days.

(21) Appl. No.: 10/757,856

(22) Filed: Jan. 14, 2004

(65) Prior Publication Data

US 2004/0145325 A1  Jul. 29, 2004

(30) Foreign Application Priority Data

Jan. 14, 2003  (JP)  ............................. 2003-005873

(51) Int. Cl.
*H02P 1/00* (2006.01)

(52) U.S. Cl. ..................... 318/254; 318/439; 318/432; 318/811

(58) Field of Classification Search ................ 318/138, 318/139, 245, 254, 439, 599, 266–273, 289–295, 318/810, 811
See application file for complete search history.

(56) References Cited

U.S. PATENT DOCUMENTS

| | | | | |
|---|---|---|---|---|
| 4,977,356 A | * | 12/1990 | Otani et al. ................. | 318/138 |
| 4,987,352 A | * | 1/1991 | Ishii ........................... | 318/254 |
| 5,331,259 A | * | 7/1994 | Naito .......................... | 318/254 |
| 5,614,797 A | * | 3/1997 | Carobolante ................. | 318/432 |
| 5,661,383 A | * | 8/1997 | Schlager et al. ............ | 318/439 |
| 5,793,170 A | * | 8/1998 | Nakai ......................... | 318/254 |
| 5,877,602 A | * | 3/1999 | Kondoh et al. ............. | 318/254 |
| 5,920,166 A | * | 7/1999 | Schlager et al. ............ | 318/439 |
| 5,959,418 A | * | 9/1999 | Gotou ........................ | 318/254 |
| 5,982,118 A | * | 11/1999 | Gotou et al. ................ | 318/254 |
| 6,172,474 B1 | * | 1/2001 | Gotou ........................ | 318/254 |
| 6,262,557 B1 | * | 7/2001 | Gotou et al. ................ | 318/811 |
| 6,320,337 B1 | * | 11/2001 | Nishimura .................. | 318/254 |
| 6,380,709 B1 | * | 4/2002 | Nishimura et al. ......... | 318/811 |
| 6,570,357 B1 | * | 5/2003 | Gotou ........................ | 318/599 |

FOREIGN PATENT DOCUMENTS

| | | |
|---|---|---|
| JP | 60-237871 | 11/1985 |
| JP | 6-169595 | 6/1994 |
| JP | 06303795 A * | 10/1994 |
| JP | 7-255191 | 10/1995 |

* cited by examiner

*Primary Examiner*—Paul Ip

(74) *Attorney, Agent, or Firm*—Anderson Kill & Olick PC

(57) ABSTRACT

A current control circuit includes a control current generation circuit that generates a control current in accordance with an external current control signal. A plurality of drive current generation circuits generate drive currents in accordance with the control current that is generated by and supplied from the control current generation circuit.

13 Claims, 7 Drawing Sheets

FIG.3

|  | T1 | T2 | T3 | T4 | T5 | T6 |
|---|---|---|---|---|---|---|
| Q21u | ON | ON | OFF | OFF | OFF | OFF |
| Q31u | OFF | OFF | OFF | ON | ON | OFF |
| Q21v | OFF | OFF | ON | ON | OFF | OFF |
| Q31v | ON | OFF | OFF | OFF | OFF | ON |
| Q21w | OFF | OFF | OFF | OFF | ON | ON |
| Q31w | OFF | ON | ON | OFF | OFF | OFF |

CURRENT CONTROL CIRCUIT AND MOTOR DRIVE CIRCUIT THAT CAN ACCURATELY AND EASILY CONTROL A DRIVE CURRENT

BACKGROUND OF THE INVENTION

1. Field of the Invention

The present invention relates to current control circuits and motor drive circuits, and more particularly, to a current control circuit and a motor drive circuit that can control a drive current in accordance with an input control signal.

2. Description of the Related Art

Conventionally, a motor drive circuit is known that controls a drive current for a motor by: driving a current mirror circuit in accordance with an external control signal; separately generating a source control current and a sink control current by the current mirror circuit; controlling a source drive circuit of the motor by the source control current generated by the current mirror circuit; and controlling a sink drive circuit by the sink control current generated by the current mirror circuit (refer to Japanese Laid-Open Patent Application No. 60-237871, for example).

The conventional motor drive circuit separately generates the source control current and the sink control current by the current mirror circuit, and controls the source drive circuit of the motor by the source control current generated by the current mirror circuit. Hence, there is a problem in that the drive current for the motor is varied when the characteristics of a transistor supplying a current to the source of the current mirror circuit and those of a transistor supplying a current to the sink of the current mirror circuit do not match.

In addition, in the conventional motor drive circuit, the configuration of the source drive circuit and that of the sink drive circuit are different. For this reason, the characteristics of the source side and those of the sink side do not match, which results in variation of the drive current for the motor.

SUMMARY OF THE INVENTION

It is a general object of the present invention to provide an improved and useful current control circuit and a motor drive circuit in which one or more of the above-mentioned problems are eliminated.

It is another and more specific object of the present invention to provide a current control circuit and a motor drive circuit that can accurately and easily control a drive current.

In order to achieve the above-mentioned objects, according to one aspect of the present invention, there is provided a current control circuit including:

a control current generation circuit that generates a control current in accordance with an external current control signal; and a plurality of drive current generation circuits that generate drive currents in accordance with the control current that is generated by and supplied from the control current generation circuit.

Additionally, according to another aspect of the present invention, there is provided a motor drive circuit including:

a first drive current control element that controls supply of a drive current to a motor;

a second drive current control element that draws the drive current from the motor;

a control current generation circuit that generates a control current in accordance with an external current control signal;

a first drive current generation circuit that drives the first drive current control element in accordance with the control current generated by and supplied from the control current generation circuit; and a second drive current generation circuit that drives the second drive current control element in accordance with the control current generated by and supplied from the control current generation circuit, wherein driving of the motor is controlled by controlling the first drive current control element and the second drive current control element that are controlled in accordance with the external current control signal.

According to the present invention, the first drive current generation circuit that drives the first drive current control element and the second drive current generation circuit that drives the second drive current control element are driven by the single control current that is generated by the control current generation circuit in accordance with the external current control signal. Hence, the control current is not varied between the first drive current generation circuit and the second drive current generation circuit. Accordingly, it is possible to accurately and easily control the drive current.

Other objects, features and advantages of the present invention will become more apparent from the following detailed description when read in conjunction with the following drawings.

BRIEF DESCRIPTION OF THE DRAWINGS

FIG. 3 is a table for explaining switching timing of transistors Q21u, Q21v, Q21w, Q31u, Q31v, and Q31w of the drive circuit 23;

DETAILED DESCRIPTION OF THE PREFERRED EMBODIMENTS

Figure 1:
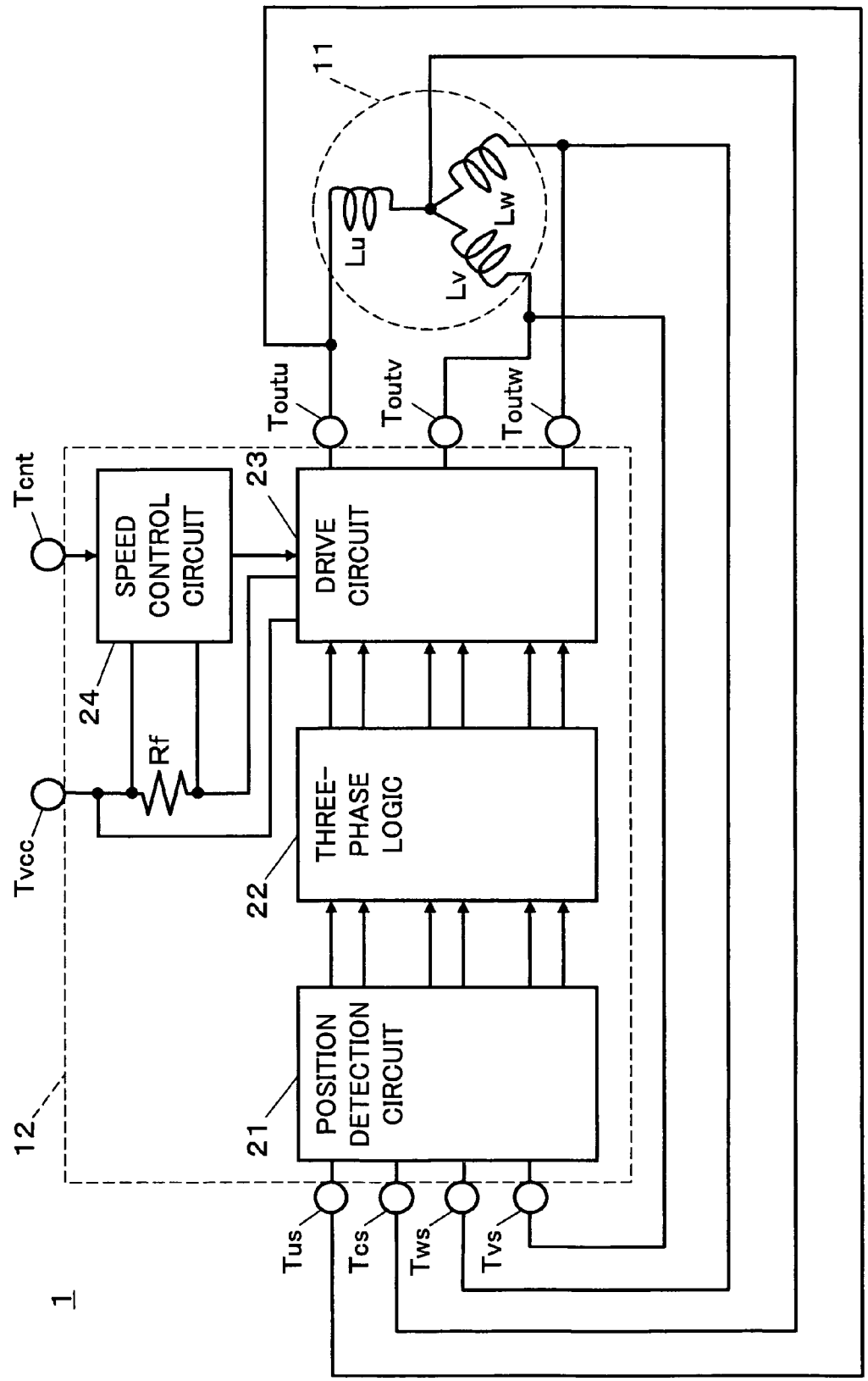
FIG. 1 is a system block diagram of one embodiment of the present invention.

FIG. 1 is a system configuration diagram of one embodiment of the present invention.

A motor drive system 1 of this embodiment includes a motor 11 and a motor drive IC (integrated circuit) 12. The motor 11 is formed by, for example, a three-phase brushless motor, which includes a U-phase coil Lu, a V-phase coil Lv, and a W-phase coil Lw. The U-phase coil Lu, the V-phase coil Lv, and the W-phase coil Lw are connected by star connection, that is, one end of each of the coils is connected to the one end of the others. The other end of the U-phase coil Lu is connected to an output terminal Toutu of the motor drive IC 12 and a voltage detection terminal Tus. The other end of the V-phase coil Lv is connected to an output terminal Toutv of the motor drive IC 12 and a voltage detection terminal Tvs. The other end of the W-phase coil Lw is connected to an output terminal Toutw of the motor drive IC 12 and a voltage detection terminal Tws. In addition, the common connection point of the U-phase coil Lu, the V-phase coil Lv, and the W-phase coil Lw is connected to a voltage detection terminal Tcs of the motor drive IC 12.

The motor drive IC 12 includes a position detection circuit 21, a three-phase logic circuit 22, a drive circuit 23, and a speed control circuit 24. The applied voltage of the U-phase coil Lu is supplied to the position detection circuit 21 from the voltage detection terminal Tus. The applied voltage of the V-phase coil Lv is supplied to the position detection circuit 21 from the voltage detection terminal Tvs. The applied voltage of the W-phase coil Lw is supplied to the position detection circuit 21 from the voltage detection terminal Tws. The voltage of the connection point of the U-phase coil Lu, the V-phase coil Lv, and the W-phase coil Lw is applied to the position detection circuit 21 from the voltage detection terminal Tcs.

The position detection circuit 21 performs waveform shaping on the voltages from the voltage detection terminals Tus, Tvs, Tws, and Tcs, and supplies the voltages to the three-phase logic circuit 22. The three-phase logic circuit 22 detects the position of a rotor magnet of the motor 11 based on a detected signal from the position detection circuit 21, and generates and supplies, to the drive circuit 23, a first U-phase timing control signal and a second U-phase timing control signal that determine the timing at which a current is applied to the U-phase coil Lu, a first V-phase timing control signal and a second V-phase timing control signal that determine the timing at which a current is applied to the V-phase coil Lv, and a first W-phase timing control signal and a second W-phase timing control signal that determine the timing at which a current is applied to the W-phase coil Lw.

It should be noted that the first U-phase timing control signal is a signal for controlling the timing at which a current is supplied to the U-phase coil Lu. The second U-phase timing control signal is a signal for controlling the timing at which a current is drawn from the U-phase coil Lu. The first V-phase timing control signal is a signal for controlling the timing at which a current is supplied to the V-phase coil Lv. The second V-phase timing control signal is a signal for controlling the timing at which a current is drawn from the V-phase coil Lv. The first W-phase timing control signal is a signal for controlling the timing at which a current is supplied to the W-phase coil Lw. The second W-phase timing control signal is a signal for controlling the timing at which a current is drawn from the W-phase coil Lw.

Additionally, a speed instruction signal is supplied to a control terminal Tcnt from an external circuit. In a case where the motor 11 is a spindle motor of a disk drive, for example, the speed instruction signal is generated by a servo control circuit based on rotation information obtained by reading a disk. In addition, the speed instruction signal is generated by the external circuit based on a reference signal and a FG signal obtained from a FG (frequency generator) sensor that is provided in advance to the motor 11. The speed instruction signal supplied to the control terminal Tcnt is supplied to the speed control circuit 24 inside the motor drive IC 12. Power source Vcc is applied to a power source terminal Tvcc. The power source terminal Tvcc is directly connected to the drive circuit 23 and is also connected to the drive circuit 23 via a resistance Rf for detecting a drive current (hereinafter referred to as a "resistance Rf"). A current supplied to the drive circuit 23 via the resistance Rf is used as the drive current for the motor 11. The voltage across the resistance Rf is applied to the speed control circuit 24. Thus, it is possible to detect a current that flows to the motor 11.

The speed control circuit 24 generates a speed control signal in accordance with the speed instruction signal from the control terminal Tcnt and the voltage across the resistance Rf. The speed control signal is a signal that controls the motor 11 to be rotated at a rotational speed corresponding to the speed instruction signal. The speed control signal generated by the speed control circuit 24 is supplied to the drive circuit 23.

Figure 2:
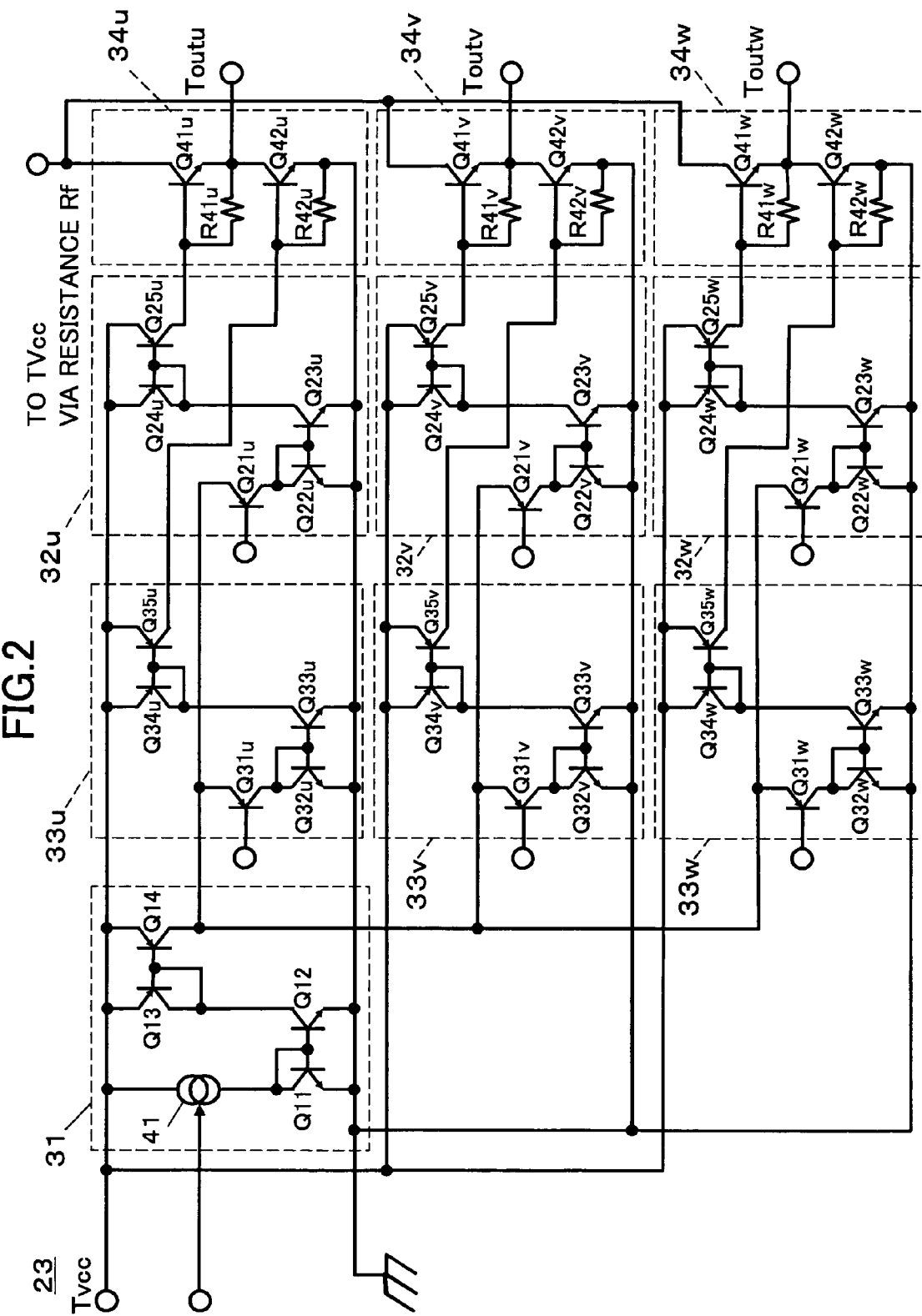
FIG. 2 is a circuit configuration diagram of a drive circuit 23.

FIG. 2 is a circuit configuration diagram of the drive circuit 23. The drive circuit 23 includes a current control circuit 31, a first U-phase drive current control circuit 32$u$, a first V-phase drive current control circuit 32$v$, a first W-phase drive current control circuit 32$w$, a second U-phase drive current control circuit 33$u$, a second V-phase drive current control circuit 33$v$, a second W-phase drive current control circuit 33$w$, a U-phase drive circuit 34$u$, a V-phase drive circuit 34$v$, and a W-phase drive circuit 34$w$. The current control circuit 31, the first U-phase drive current control circuit 32$u$, the first V-phase drive current control circuit 32$v$, the first W-phase drive current control circuit 32$w$, the second U-phase drive current control circuit 33$u$, the second V-phase drive current control circuit 33$v$, and the second W-phase drive current control circuit 33$w$ are connected to the power source terminal Tvcc. The power source Vcc is supplied from the power source terminal Tvcc. Additionally, the U-phase drive circuit 34$u$, the V-phase drive circuit 34$v$, and the W-phase drive circuit 34$w$ are connected to the power source terminal Tvcc via the resistance Rf. The power source voltage Vcc is supplied from the power source terminal Tvcc via the resistance Rf.

The current control circuit 31 includes a variable current source 41, NPN transistors Q11 and Q12, and PNP transistors Q13 and Q14. The speed control signal is supplied to the variable current source 41 from the speed control circuit 24. The variable current source 41 outputs a current corresponding to the speed control signal. Each pair of the NPN transistors Q11 and Q12, and the PNP transistors Q13 and Q14 forms a current mirror circuit. The current mirror circuit formed by the NPN transistors Q11 and Q12 draws from the current mirror circuit formed by the PNP transistors Q13 and Q14 a current corresponding to the current that is output from the variable current source 41. The current mirror circuit formed by the PNP transistors Q13 and Q14 outputs from the collector of the PNP transistor Q14 a current corresponding to the current that is drawn by the current mirror circuit formed by the NPN transistors Q11 and Q12, that is, a current corresponding to the speed control signal.

The current output from the collector of the PNP transistor Q14 is supplied to the first U-phase drive current control circuit 32$u$, the first V-phase drive current control circuit 32$v$, the first W-phase drive current control circuit 32$w$, the second U-phase drive current control circuit 33$u$, the second V-phase drive current control circuit 33$v$, and the second W-phase drive current control circuit 33$w$. On this occasion, the currents supplied to the first U-phase drive current control circuit 32$u$, the first V-phase drive current control circuit 32$v$, the first W-phase drive current control circuit 32$w$, the second U-phase drive current control circuit 33$u$, the second V-phase drive current control circuit 33$v$, and the second W-phase drive current control circuit 33$w$ are all supplied from the collector of the PNP transistor Q14. Accordingly, it is possible to supply a current to each circuit without variation.

The first U-phase drive current control circuit 32$u$ is formed by transistors Q21$u$ through Q25$u$. The transistor Q21$u$ is formed by a PNP transistor and constitutes a switch circuit. A current is supplied to the emitter of the transistor Q21u from the collector of the PNP transistor Q14. The collector of the transistor Q21u is connected to the collector and base of the transistor Q22u and the base of the transistor Q23u. The first U-phase timing control signal is supplied to the base of the transistor Q21u from the three-phase logic circuit 22. The transistor Q21u is switched in accordance with the first U-phase timing control signal. When the transistor Q21u is ON, a current is supplied to a current mirror circuit formed by the transistors Q22u and Q23u.

The current mirror circuit formed by the transistors Q22u and Q23u draws from a current mirror circuit formed by the transistors Q24u and Q25u a current corresponding to an emitter current of the transistor Q21u. The current mirror circuit formed by the transistors Q24u and Q25u supplies to the U-phase drive circuit 34u a current corresponding to the current drawn by the current mirror circuit formed by the transistors Q22u and Q23u.

It should be noted that the current mirror circuit formed by the transistors Q22u and Q23u, and the current mirror circuit formed by the transistors Q24u and Q25u amplify the current from the current control circuit 31 and supply the amplified current to the U-phase drive circuit 34u.

The second U-phase drive circuit 33u is formed by transistors Q31u through Q35u. The transistor Q31u is formed by a PNP transistor and constitutes a switch circuit. A current is supplied to the emitter of the transistor Q31u from the collector of the transistor Q14. Additionally, the collector of the transistor Q31u is connected to the collector and base of the transistor Q32u and the base of the transistor Q33u. The second U-phase timing control signal is supplied to the base of the transistor Q31u from the three-phase logic circuit 22. The transistor Q31u is switched in accordance with the second U-phase timing control signal. When the transistor Q31u is ON, a current is supplied to a current mirror circuit formed by the transistors Q32u and Q33u.

The current mirror circuit formed by the transistors Q32u and Q33u draws from a current mirror circuit formed by the transistors Q34u and Q35u a current corresponding to an emitter current of the transistor Q31u. The current mirror circuit formed by the transistors Q34u and Q35u supplies to the U-phase drive circuit 34u a current corresponding to the current drawn by the current mirror circuit formed by the transistors Q32u and Q33u.

It should be noted that the current mirror circuit formed by the transistors Q32u and Q33u, and the current mirror circuit formed by the transistors Q34u and Q35u amplify the current from the current control circuit 31 and supply the amplified current to the U-phase drive circuit 34u.

The U-phase drive circuit 34 includes transistors Q41u and Q42u, and resistances R41u and R42u. The transistors Q41u and Q42u are formed by NPN transistors of an identical polarity. The emitter of the transistor Q41u and the collector of the transistor Q42u are connected in series and the power source voltage is applied across the transistors Q41u and Q42u.

The resistance R41u is connected between the base and emitter of the transistor Q41u and biases the transistor Q41u. A current from the first U-phase drive current control circuit 32u is supplied to the base of the transistor Q41u. The transistor Q41u is ON when the current is supplied from the first U-phase drive current control circuit 32u, and is OFF when the current from the first U-phase drive current control circuit 32u is stopped.

The resistance R42u is connected between the base and emitter of the transistor Q42u and biases the transistor Q42u. A current from the second U-phase drive current control circuit 33u is supplied to the base of the transistor Q42u. The transistor Q42u is ON when the current is supplied from the second U-phase drive current control circuit 33u, and is OFF when the current from the second U-phase drive current control circuit 33u is stopped. The connection point of the emitter of the transistor Q41u and the collector of the transistor Q42u is connected to an output terminal Toutu. The U-phase coil Lu is connected to the output terminal Toutu. A current that flows to the U-phase coil Lu is controlled in accordance with the states of the transistors Q41u and Q42u.

When the transistor Q41u is ON and the transistor Q42u is OFF, a drive current is supplied to the output terminal Toutu. Thus, the drive current is supplied to the U-phase coil Lu. Additionally, when the transistor Q41u is OFF and the transistor Q42u is ON, a current is drawn from the output terminal Toutu. Thus, the current is drawn from the U-phase coil Lu.

It should be noted that the configuration of the first V-phase drive current control circuit 32v is the same as that of the above-mentioned first U-phase drive current control circuit 32u. Current supply to the V-phase drive circuit 34v is controlled by the first V-phase timing control signal. Additionally, the configuration of the second V-phase drive current control circuit 33v is the same as that of the second U-phase drive current control circuit 33u. Current supply to the V-phase drive circuit 34v is controlled by the second V-phase timing control signal.

Further, the configuration of the first W-phase drive current control circuit 32w is the same as that of the above-mentioned first U-phase drive current control circuit 32u. Current supply to the W-phase drive circuit 34w is controlled by the first W-phase timing control signal. Additionally, the configuration of the second W-phase drive current control circuit 33w is the same as that of the above-mentioned second U-phase drive current control circuit 33u. Current supply to the W-phase drive circuit 34w is controlled by the second W-phase timing control signal.

In addition, since the V-phase drive circuit 34v and the W-phase drive circuit 34w have the same configurations as that of the above-mentioned U-phase drive circuit 34, a description thereof is omitted.

Next, a description is given below of operations of the drive circuit 23.

Figure 4:
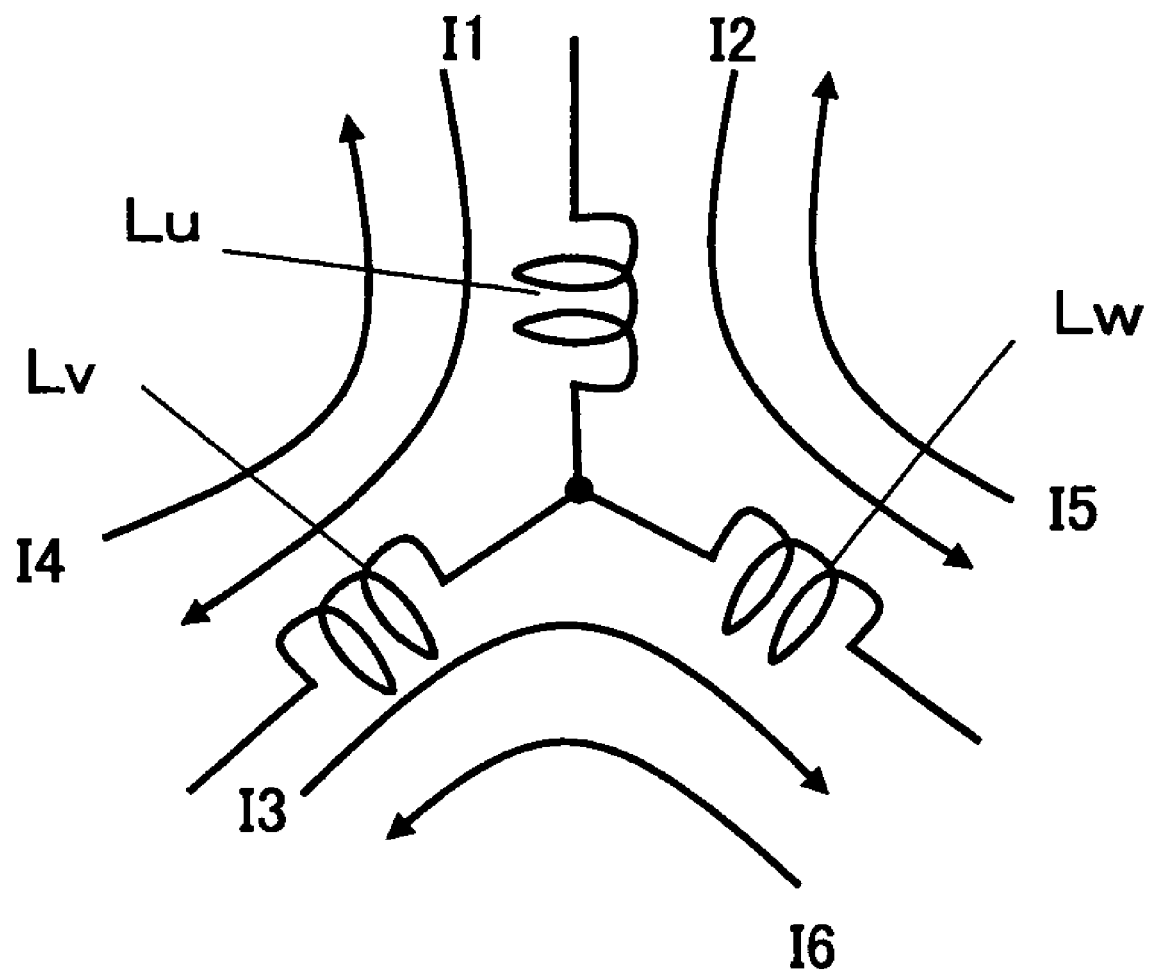
FIG. 4 is a schematic diagram showing the directions of currents that flow to a U-phase coil Lu, a V-phase coil Lv, and a W-phase coil Lw.

FIG. 3 is a table for explaining the switching timing of the transistors Q21u, Q21v, Q21w, Q31u, Q31v, and Q31w of the drive circuit 23. FIG. 4 is a diagram for showing currents that flow to the U-phase coil Lu, the V-phase coil Lv, and the W-phase coil Lw.

During a term T1, the second U-phase timing control signal, the first V-phase timing control signal, the first W-phase timing control signal, and the second W-phase timing control signal are at high levels, and the first U-phase timing control signal and the second V-phase timing control signal are at low levels. Thus, the transistors Q31u, Q21v, Q21w, and Q31w are OFF, and the transistors Q21u and Q31v are ON. Hence, a current flows to the output terminal Toutu, and a current is drawn from the output terminal Toutv. Accordingly, during the term T1, a current flows in the direction indicated by I1 in FIG. 4.

During a term T2, the second U-phase timing control signal, the first V-phase timing control signal, the second V-phase timing control signal, and the first W-phase timing control signal are at high levels, and the first U-phase timing control signal and the second W-phase timing control signal are at low levels. Thus, the transistors Q31u, Q21v, Q31v, and Q21w are OFF, and the transistors Q21u and Q31w are ON. Hence, a current flows to the output terminal Toutu, and a current is drawn from the output terminal Toutw. Accordingly, during the term T2, a current flows in the direction indicated by I2 in FIG. 4.

During a term T3, the first U-phase timing control signal, the second U-phase timing control signal, the second V-phase timing control signal, and the first W-phase timing control signal are at high levels, and the first V-phase timing control signal and the second W-phase timing control signal are at low levels. Thus, the transistors Q21u, Q31u, Q31v, and Q21w are OFF, and the transistors Q21v and Q31w are ON. Hence, a current flows to the output terminal Toutv, and a current is drawn from the output terminal Toutw. Accordingly, during the term T3, a current flows in the direction indicated by I3 in FIG. 4.

During a term T4, the first U-phase timing control signal, the second V-phase timing control signal, the first W-phase timing control signal, and the second W-phase timing control signal are at high levels, and the second U-phase timing control signal and the first V-phase timing control signal are at low levels. Thus, the transistors Q21u, Q31v, Q21w, and Q31w are OFF, and the transistors Q31u and Q21v are ON. Hence, a current flows to the output terminal Toutv, and a current is drawn from the output terminal Toutu. Accordingly, during the term T4, a current flows in the direction indicated by I4 in FIG. 4.

During a term T5, the first U-phase timing control signal, the first V-phase timing control signal, the second V-phase timing control signal, and the second W-phase timing control signal are at high levels, and the second U-phase timing control signal and the first W-phase timing control signal are at low levels. Thus, the transistors Q21u, Q21v, Q31v, and Q31w are OFF, and the transistors Q31u and Q21w are ON. Hence, a current flows to the output terminal Toutw, and a current is drawn from the output terminal Toutu. Accordingly, during the term T5, a current flows in the direction indicated by I5 in FIG. 4.

During a term T6, the first U-phase timing control signal, the second U-phase timing control signal, the first V-phase timing control signal, and the second W-phase timing control signal are at high levels, and the second V-phase timing control signal and the first W-phase timing control signal are at low levels. Thus, the transistors Q21u, Q31u, Q21v, and Q31w are OFF, and the transistors Q31v and Q21w are ON. Hence, a current flows to the output terminal Toutv, and a current is drawn from the output terminal Toutv. Accordingly, during the term T6, a current flows in the direction indicated by I6 in FIG. 4. By repeating the above-mentioned operations during the terms T1 through T6, a rotating magnetic field is produced among the U-phase coil Lu, the V-phase coil Lv, and the W-phase coil Lw. Thus, the rotor magnet of the motor 11 is rotated.

According to this embodiment, the first U-phase drive current control circuit 32u, the second U-phase drive current control circuit 33u, the first V-phase drive current control circuit 32v, the second V-phase drive current control circuit 33v, the first W-phase drive current control circuit 32w, and the second W-phase drive current control circuit 33w are all controlled by the output current of the current control circuit 31. Hence, the drive current is less likely to be affected by variations in characteristics of the transistors. Additionally, since the same circuit configuration can be used on both source side and sink side, it is possible to reduce variations in characteristics of elements between the source side and the sink side.

Additionally, the transistors of the drive circuit 23 of this embodiment may be formed by transistors of the reverse polarities.

Figure 5:
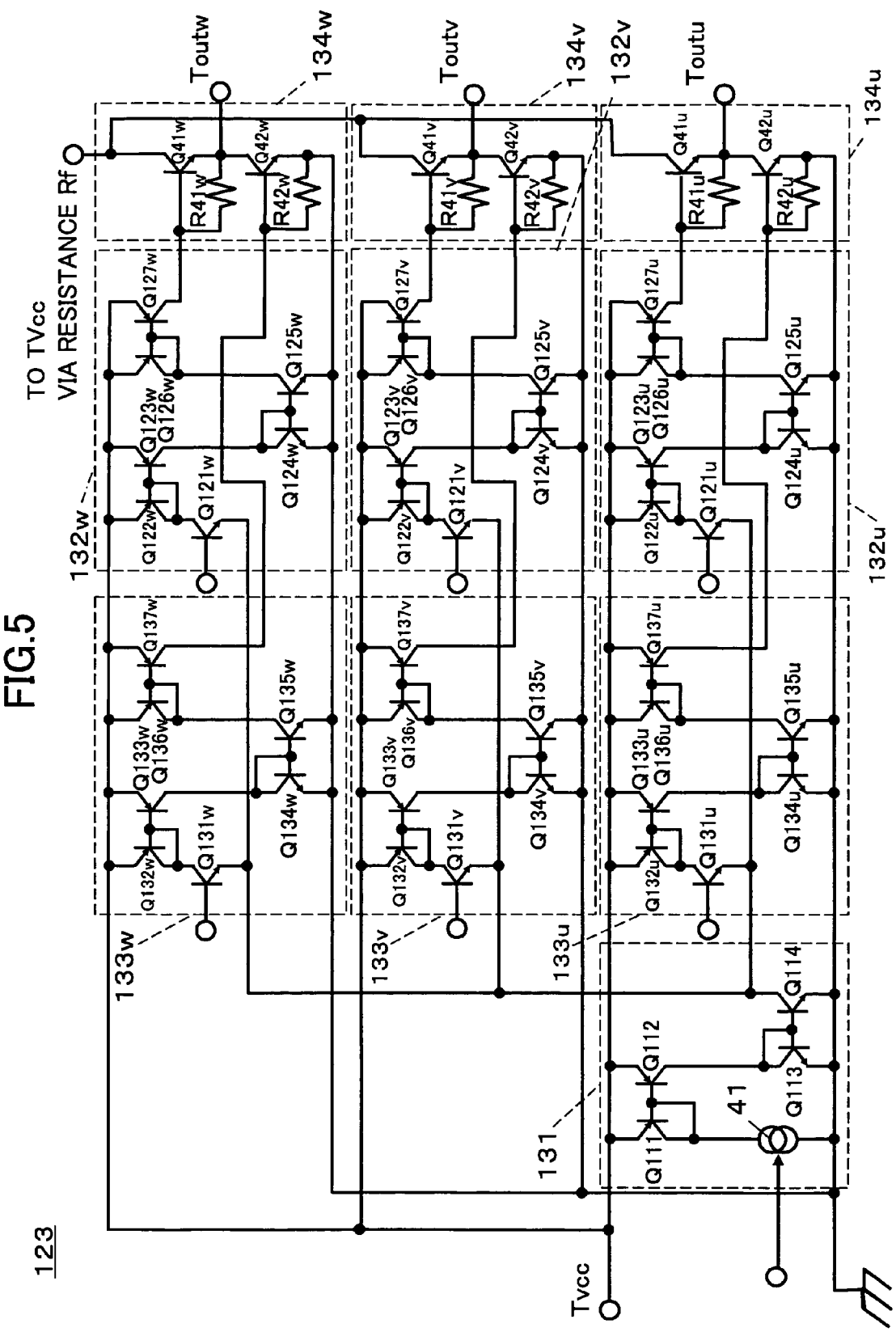
FIG. 5 is a circuit configuration diagram of a first modification of the drive circuit 23.

FIG. 5 is a circuit configuration diagram of a first modification of the drive circuit 23. In FIG. 5, those parts that are the same as those corresponding parts in FIG. 2 are designated by the same reference numerals, and a description thereof is omitted.

In a drive circuit 123 according to this modification, a current control circuit 131, a first U-phase drive current control circuit 132u, a second U-phase drive current control circuit 133u, a first V-phase drive current control circuit 132v, a second V-phase drive current control circuit 133v, a first W-phase drive current control circuit 132w, a second W-phase drive current control circuit 133w are formed by transistors having the polarities opposite to those of the corresponding transistors in the drive circuit 23 shown in FIG. 2.

The current control circuit 131 includes transistors Q111 through Q114. The transistors Q111 and Q112 correspond to the transistors Q11 and Q12 shown in FIG. 2, respectively, and are formed by transistors having the polarity opposite to that of the transistors Q11 and Q12. Additionally, the transistors Q113 and Q114 correspond to the transistors Q13 and Q14 shown in FIG. 2, respectively, and are formed by transistors having the polarity opposite to that of the transistors Q13 and Q14. Further, the polarities of the first U-phase timing control signal, the second U-phase timing control signal, the first V-phase timing control signal, the second V-phase timing control signal, the first W-phase timing control signal, and the second W-phase timing control signal are also reversed.

Additionally, the first U-phase drive current control circuit 132u is formed by transistors Q121u through Q127u. The transistor Q121u corresponds to the transistor Q21u shown in FIG. 2, and is formed by a transistor having the polarity opposite to that of the transistor Q21u. The transistors Q122u and Q123u correspond to the transistors Q22u and Q23u shown in FIG. 2, respectively, and are formed by transistors having the polarity opposite to that of the transistors Q22u and Q23u. The transistors Q124u and Q125u correspond to the transistors Q24u and Q25u shown in FIG. 2, respectively, and are formed by transistors having the polarity opposite to that of the transistors Q24u and Q25u. Further, the transistors Q126u and Q127u constitute a current mirror circuit for reversing a current.

Additionally, the second U-phase drive current control circuit 133u is formed by transistors Q131u through Q137u. The transistor Q131u corresponds to the transistor Q31u shown in FIG. 2, and is formed by a transistor having the polarity opposite to that of the transistor Q31u. The transistors Q132u and Q133u correspond to the transistors Q32u and Q33u shown in FIG. 2, respectively, and are formed by transistors having the polarity opposite to that of the transistors Q32u and Q33u. The transistors Q134u and Q135u correspond to the transistors Q34u and Q35u shown in FIG. 2, respectively, and are formed by transistors having the polarity opposite to that of the transistors Q34u and Q35u. Further, the transistors Q136u and Q137u constitute a current mirror circuit for reversing a current.

Further, the configurations of the first V-phase drive current control circuit 132v and the first W-phase drive current control circuit 132w are the same as that of the first U-phase drive current control circuit 132u. The configurations of the second V-phase drive current control circuit 133v and the second W-phase drive current control circuit 133w are the same as that of the second U-phase drive current control circuit 133u.

According to this modification, similar to the drive circuit 23 shown in FIG. 2, the current control circuit 131 supplies a current to all of the first U-phase drive current control circuit 132u, the first V-phase drive current control circuit 132v, the first W-phase drive current control circuit 132w, the second U-phase drive current control circuit 133u, the second V-phase drive current control circuit 133v, and the second W-phase drive current control circuit 133w. Accordingly, the drive current is less likely to be affected by variations in the transistors and the like. In addition, since the source side and the sink side can be driven by the circuits having the same configuration, it is possible to reduce variations in characteristics between the source side and the sink side.

Further, in this embodiment, the transistors Q41u and Q42u, Q41v and Q42v, and Q41w and Q42w forming the U-phase drive circuit 34u, the V-phase drive circuit 34v, and the W-phase drive circuit 34w, respectively, are of the same polarity. However, the polarity of the transistors Q41u, Q41v, and Q41w may be opposite to that of the transistors Q42u, Q42v, and Q42w.

Figure 6:
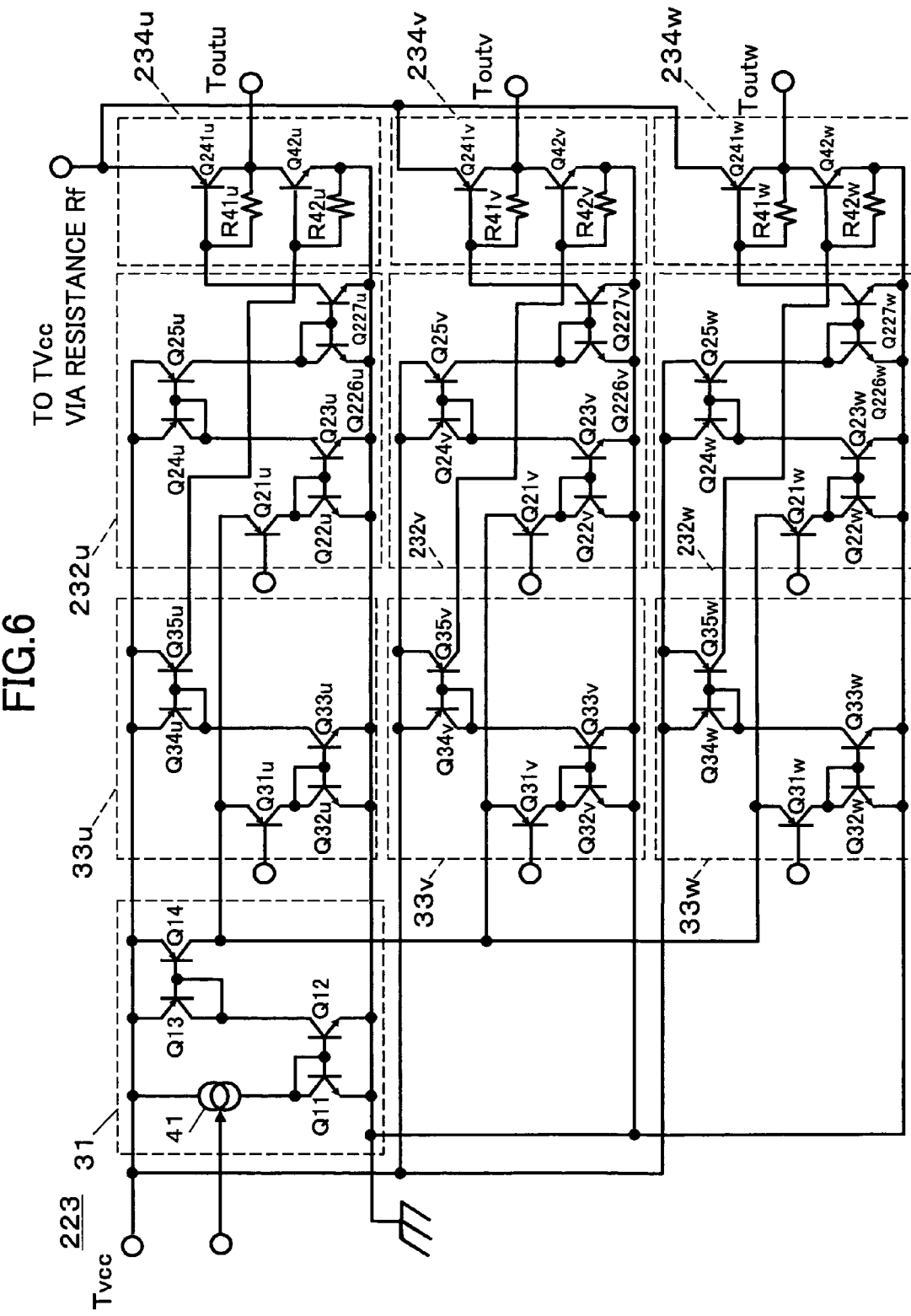
FIG. 6 is a circuit configuration diagram of a second modification of the drive circuit 23.

FIG. 6 is a circuit configuration diagram of a second modification of the drive circuit 23. In FIG. 6, those parts that are the same as those corresponding parts in FIG. 2 are designated by the same reference numerals, and a description thereof is omitted.

In a drive circuit 223 according to this modification, transistors Q241u, Q241v, and Q241w of a U-phase drive circuit 234u, a V-phase drive circuit 234v, and a W-phase drive circuit 234w, respectively, are formed by PNP transistors having the polarity opposite to that of the transistors Q41u, Q41v, and Q41w of the U-phase drive circuit 34u, the V-phase drive circuit 34v, and the W-phase drive circuit 34w shown in FIG. 2, respectively.

Hence, in this modification, a current mirror circuit that is formed by transistors Q226u and Q227u and serves to reverse a current is added to the first U-phase drive current control circuit 232u. In addition, similarly, a current mirror circuit that is formed by transistors Q226v and Q227v and serves to reverse a current is added to the first V-phase drive current control circuit 232v. Further, a current mirror circuit that is formed by transistors Q226w and Q227w and serves to reverse a current is added to the first W-phase drive current control circuit 232w.

Additionally, transistors constituting the drive circuit 223 may be transistors having the polarities opposite to those of the transistors in the second modification.

Figure 7:
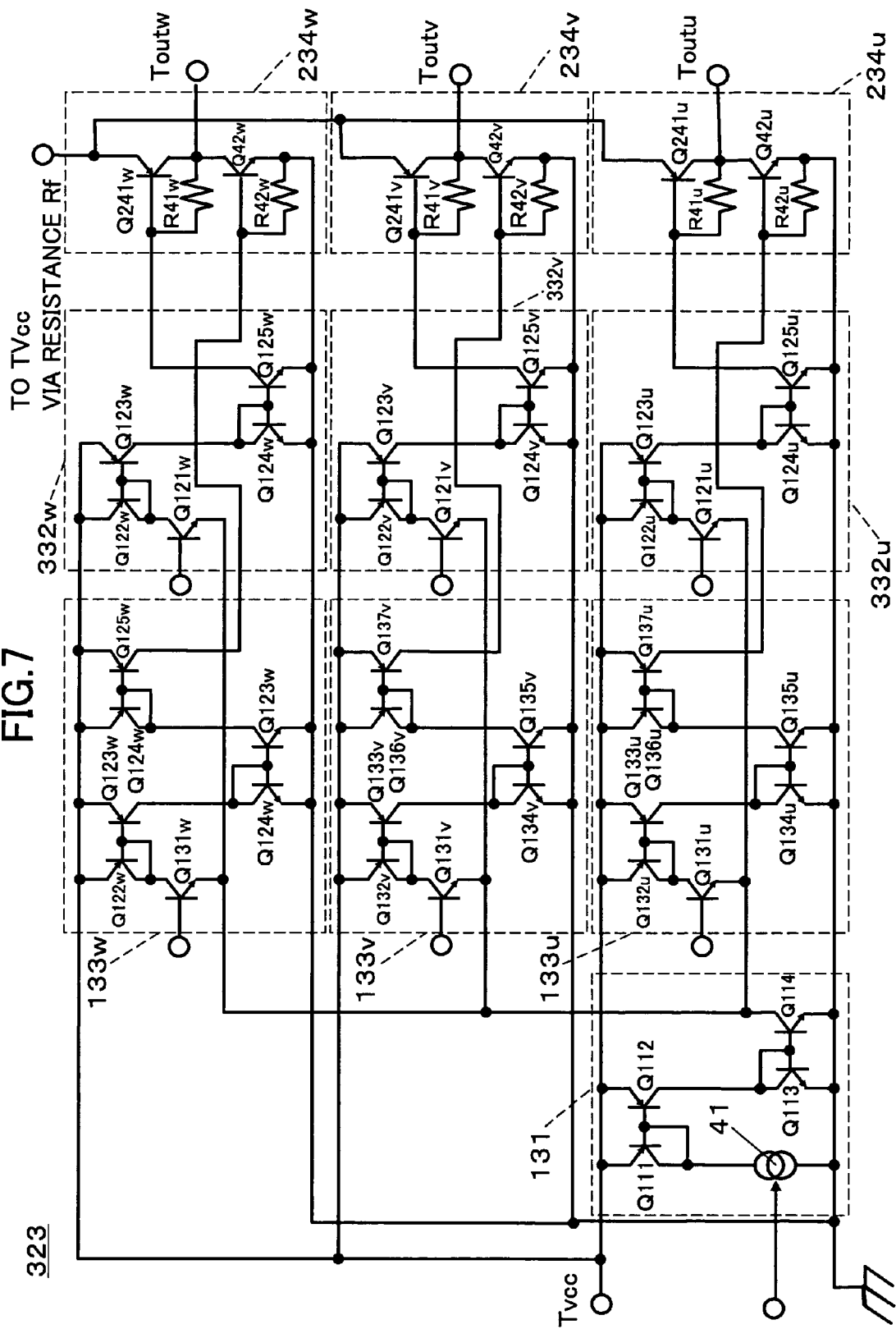
FIG. 7 is a circuit configuration diagram of a third modification of the drive circuit 23.

FIG. 7 is a circuit configuration diagram of a third modification of the drive circuit 23. In FIG. 7, those parts that are the same as those corresponding parts in FIGS. 5 and 6 are designated by the same reference numerals, and a description thereof is omitted.

The configuration of a drive circuit 323 according to this modification, which is shown in FIG. 7, is similar to that of the drive circuit 123 shown in FIG. 5. However, in FIG. 7, the U-phase drive circuit 134u, the V-phase drive circuit 134v, and the W-phase drive circuit 134w of the drive circuit 123 are replaced by the U-phase drive circuit 234u, the V-phase drive circuit 234v, and the W-phase drive circuit 234w, respectively. Based on this, the configurations of a first U-phase drive current control circuit 332u, a first V-phase drive current control circuit 332v, and a first W-phase drive current control circuit 332w are different from those of the corresponding circuits of the drive circuit 123 shown in FIG. 5. The first U-phase drive current control circuit 332u has a configuration in which the transistors Q126u and Q127u for reversing polarity are eliminated from the first U-phase drive current control circuit 132u shown in FIG. 5. The first V-phase drive current control circuit 332v has a configuration in which the transistors Q126v and Q127v for reversing polarity are eliminated from the first V-phase drive current control circuit 132v shown in FIG. 5. The first W-phase drive current control circuit 332w has a configuration in which the transistors Q126w and Q127w for reversing polarity are eliminated from the first W-phase drive current control circuit 132w shown in FIG. 5.

Additionally, in the above-mentioned embodiment and modifications, the drive circuits 23, 123, 223, and 323 are applied to the sensor-less three-phase brushless motor. However, each of the above-mentioned drive circuits may also be applied to a motor drive circuit of a motor that detects a rotating position of a rotor by a sensor such as a Hall element.

Further, in the above-mentioned embodiment and modifications, the descriptions are given of the drive circuits 23, 123, 223, and 323 by taking the thee-phase brushless motor as the example. However, each of the above-mentioned drive circuits may also be used as a circuit for controlling a drive current for an apparatus that is driven by controlling source transistors and sink transistors.

In addition, in the above-mentioned embodiment and modifications, the examples are shown in which the resistance Rf for detecting a current supplied to the motor 11 is incorporated in the motor drive IC 12. However, this is not a limitation, and the resistance Rf may be provided outside the motor drive IC 12.

The present invention is not limited to the specifically disclosed embodiments, and variations and modifications may be made without departing from the scope of the present invention.

The present application is based on Japanese priority application No. 2003-005873 filed on Jan. 14, 2003, the entire contents of which are hereby incorporated by reference.

What is claimed is:

1. A current control circuit comprising:
   a control current generation circuit that generates a control current in accordance with an external current control signal; and
   a plurality of drive current generation circuits that generate drive currents in accordance with the control current that is generated by and supplied from said control current generation circuit, wherein the control current generation circuit comprises:
   a variable current source that generates and outputs a current corresponding to the external current control signal;
   a first current mirror circuit that generates a current corresponding to the current generated by said variable current source; and
   a second current mirror circuit that generates a current corresponding to the current generated by said first current mirror circuit and supplies the generated current to the drive current generation circuits.

2. The current control circuit as claimed in claim 1, wherein the variable current source supplies a current to the first current mirror circuit,
   the first current mirror circuit draws from the second current mirror circuit a current corresponding to the current supplied from the variable current source, and
   the second current mirror circuit generates a current corresponding to the current drawn by the first current mirror circuit and supplies the generated current to the drive current generation circuits.

3. The current control circuit as claimed in claim 1, wherein the variable current source draws a current from the first current mirror circuit,
   the first current mirror circuit supplies to the second current mirror circuit a current corresponding to the current drawn by the variable current source, and
   the second current mirror circuit draws from the drive current generation circuits a current corresponding to the current supplied from the first current mirror circuit.

4. A motor drive circuit comprising:
   a first drive current control element that controls supply of a drive current to a motor;
   a second drive current control element that draws the drive current from the motor;
   a control current generation circuit that generates a control current in accordance with an external current control signal;
   a first drive current generation circuit that drives said first drive current control element in accordance with the control current generated by and supplied from said control current generation circuit; and
   a second drive current generation circuit that drives said second drive current control element in accordance with the control current generated by and supplied from said control current generation circuit,
   wherein driving of the motor is controlled by controlling said first drive current control element and said second drive current control element which elements are controlled in accordance with the external current control signal, and
   wherein the control current generation circuit comprises:
   a variable current source that generates and outputs a current corresponding to the external current control signal;
   a first current mirror circuit that generates a current corresponding to the current generated by said variable current source; and
   a second current mirror circuit that generates a current corresponding to the current generated by said first current mirror circuit and supplies the generated current to the first drive current generation circuit and the second drive current generation circuit.

5. The motor drive circuit as claimed in claim 4, wherein the variable current source supplies a current to the first current mirror circuit,
   the first current mirror circuit draws from the second current mirror circuit a current corresponding to the current supplied from the variable current source, and
   the second current mirror circuit generates a current corresponding to the current drawn by the first current mirror circuit and supplies the generated current to the first drive current generation circuit and the second drive current generation circuit.

6. The motor drive circuit as claimed in claim 5, wherein the first drive current control element and the second drive current control element are formed by transistors of the same polarity, and
   the first drive current generation circuit and the second drive current generation circuit have the same circuit configurations.

7. The motor drive circuit as claimed in claim 5, wherein the motor comprises coils of a plurality of phases,
   a set of the first drive current generation circuit and the second drive current generation circuit is provided for each of the coils of the phases, and
   the first drive current generation circuits and the second drive current generation circuits of the phases are driven by the control current generated by the control current generation circuit.

8. The motor drive circuit as claimed in claim 4, wherein the variable current source draws a current from the first current mirror circuit,
   the first current mirror circuit supplies to the second current mirror circuit a current corresponding to the current drawn by the variable current source, and
   the second current mirror circuit draws from the first drive current generation circuit and the second drive current generation circuit a current corresponding to the current supplied from the first current mirror circuit.

9. The motor drive circuit as claimed in claim 8, wherein the first drive current control element and the second drive current control element are formed by transistors of the same polarity, and
   the first drive current generation circuit and the second drive current generation circuit have the same circuit configurations.

10. The motor drive circuit as claimed in claim 8, wherein the motor comprises coils of a plurality of phases,
    a set of the first drive current generation circuit and the second drive current generation circuit is provided for each of the coils of the phases, and
    the first drive current generation circuits and the second drive current generation circuits of the phases are driven by the control current generated by the control current generation circuit.

11. The motor drive circuit as claimed in claim 4, wherein the first drive current control element and the second drive current control element are formed by transistors of the same polarity, and
    the first drive current generation circuit and the second drive current generation circuit have the same circuit configurations.

12. The motor drive circuit as claimed in claim 11, wherein the motor comprises coils of a plurality of phases,
    a set of the first drive current generation circuit and the second drive current generation circuit is provided for each of the coils of the phases, and
    the first drive current generation circuits and the second drive current generation circuits of the phases are driven by the control current generated by the control current generation circuit.

13. The motor drive circuit as claimed in claim 4, wherein the motor comprises coils of a plurality of phases,
    a set of the first drive current generation circuit and the second drive current generation circuit is provided for each of the coils of the phases, and
    the first drive current generation circuits and the second drive current generation circuits of the phases are driven by the control current generated by the control current generation circuit.

* * * * *